United States Patent Office 3,527,729
Patented Sept. 8, 1970

3,527,729
GLARE-FREE COATING COMPOSITIONS OF ELASTOMERIC PARTICLES IN AN ELASTOMERIC FILM-FORMER
Wallace Karl Bingham, Woodbury Township, Washington County, Leonard L. Olson, St. Paul Park, and Philip V. Palmquist, Maplewood, Minn., assignors to Minnesota Mining and Manufacturing Company, St. Paul, Minn., a corporation of Delaware
No Drawing. Continuation-in-part of application Ser. No. 377,039, June 22, 1964. This application June 3, 1965, Ser. No. 461,159
Int. Cl. C08g 41/04, 51/14, 22/04
U.S. Cl. 260—37    18 Claims

ABSTRACT OF THE DISCLOSURE

Non-smooth essentially glare-free optically-flat mark-resistant tough and non-abrading paint films; and compositions and methods for forming the same. The compositions contain elastomeric particles of a size between 3 and 150 microns in a mobile vehicle phase containing a non-volatile elastomer-film-forming organic binder material. Pigment may be present in both the particles and elastomeric film-forming organic binder material. The elastomeric particles account for between 25 and 75% of the volume of solids material in the compositions and films. Glass beads are optional.

---

This application is a continuation-in-part of our application Ser. No. 377,039, filed June 22, 1964, now abandoned.

This invention relates to new paint compositions, methods of forming improved paint films, new finished non-tacky paint films, and structures having the paint films as a new part thereof. More particularly, the invention relates to new mobile compositions which may be applied as a paint-like film on a substrate and formed into a finished film state having an essentially glare-free flat and mark-resistant surface of tough non-abrading character. "Flat" as used herein means "optically flat."

These compositions are useful to form films on walls, ceilings, automobile dash-boards, office equipment, plastic and rubber articles (foamed or non-foamed), sheet materials or films (films containing vinyl-type resins, fabrics, paper), microporous sheets or articles (both natural and synthetic), and on a variety of other substrates where flatness as well as high resistance to unsightly marking is desired. Coated sheet material may be used as a wall covering or upholstery material, or in other ways. Coated embossable or formable metal sheet stock (usually marketed to converters in coiled condition) is useful in stamping and forming operations.

The paint compositions of this invention are not characterized by a mere overloading of conventional pigment and filler and filler materials (whether organic or inorganic) as done heretofore in both varnish base and latex paint compositions to gain flatness. Rubbing a paint film containing an overloading of such conventional ingredients either tends to cause the film to become shiny or glossy in the rubbed area or, especially when larger heretofore-known particles have been used (e.g., particles of polypropylene, silica, diatomaceous earth, and the like), to become otherwise marked as by an accumulation of the material used in rubbing the film. They are particularly susceptible to such unsightly marking deposits as are caused by rubbing a fingernail thereover. Cleaning of such films free of accumulated debris usually presents a serious problem since the cause of the accumulation (i.e., abrasive action of the film on materials rubbed thereover) works against convenient cleaning without leaving additional or different unsightly markings.

A further type of marking is that caused by abrasive removal of portions of a film. Dragging a steel dissecting needle with moderate hand pressure (at a 30° angle to the paint surface) over the surface of flat paint films of the type heretofore known has been noted to cause such marking in that the needle causes pigment and varnish material to be flaked away (particularly in the case of known films containing polypropylene particles).

Thus, it appears from the prior art that the very particles which contribute to flatness of paints are also responsible for a tendency toward ease of marking. In short, attaining a combination of flatness and mark-resistance in films formed by paint techniques is by no means a problem to which the solution is apparent from the prior art.

Flatness of the paints of this invention is not gained by mere overloading of pigment, but by the use of particles of special character. These particles are present in a special relationship to give a mark-resistance performance considered unique in the paint art. Rubbing a fingernail over films of this invention does not cause marking: material of the fingernail is not abraded by the paint film nor vice versa.

A steel dissecting needle dragged at a 30° angle, as aforenoted, over paint films of this invention causes deformation of portions of the films, even including localized stretching. But deformed portions recover their original shape shortly after removal of the steel pointer instrument; and the film, in significant respects, is neither marked by being abraded nor by material abraded from the instrument. The film deforms and yields under pressure or localized tension, yet is tough and resistant to abrasion such that it resists tearing and erosion when deformed. It recovers from deformation relatively rapidly after removal of the force causing the same such that marking damage is essentially obviated.

Mark-resistant characteristics for films of the invention, in combination with essentially glare-free flatness and a tough non-abrading character, are obtained by employing compositions having two essential phases: a dispersed elastomeric particle phase and a mobile vehicle phase containing a proper balance of non-volatile ingredients to furnish an elastomeric matrix for the elastomeric particles in the final finished paint film. The elastomeric particles are non-coalescing. They are of a size between about 3 and 150 microns. They are dispersed in the mobile vehicle phase of the composition at a Particle Volume Concentration (defined hereinafter) within the range of 20% to 75%. At least 5% of the weight of the mobile vehicle phase is accounted for by non-volatile elastomer-film-forming organic material. Further, from 60% to 100% by weight of the total non-volatile material of the vehicle phase is elastomer-film-forming organic material; and from 0% to 40% of the non-volatile material in the vehicle phase may be pigment. The elastomeric particles are insoluble in the vehicle phase. They also may contain 0% to 40% pigment by weight. The total volume of any dispersed pigment in the vehicle phase plus the total volume of all particles upwards of 3 microns in size in the composition account for no more than about 85% of the total volume of non-volatile material in the composition. Elastomeric particles and the non-volatile ingredients of the vehicle phase both exhibit elastomeric properties in the final film; and this will be further described. Preferred compositions form films wherein the elastomeric characteristics of the particles and the non-volatile ingredients are relatively closer together. Indeed, compositions useful to form the more highly mark-resistant films have elastomeric particles and non-volatile vehicle phase solids with basic components selected from the same chemical class or from related chemical classes.

Because "vehicle phase" as used herein is intended to include more than the ordinary meaning for that term as heretofore applied to paints, the definition for that term as used herein is in order. The term "vehicle," as well as "vehicle phase," refers to and includes all ingredients in the composition except the ingredients in or as a part of particles having a size of 3 microns or more. Thus, it includes suspended solid particles below 3 microns in size (including pigments of conventional size) in the liquid phase of the composition. It includes volatile liquid that may be present in the composition (except that volatile liquid which may be within any micropores of elastomeric particles of 3 microns or more in the composition). It includes all organic film-forming binder ingredients dissolved or dispersed (as coalesceable droplets of the size well below 3 microns) in the volatile liquid of the composition. It includes any thickeners or other ingredients which volatilize from an applied film or remain as part of the continuous matrix of an applied film (within which particles of 3 microns or more are bonded).

"Film-forming" and "elastomer-film-forming," as used herein with reference to organic material of the vehicle phase, refer to organic material which provides the elastomeric organic continuous matrix film for holding the elastomeric particles in position in the finished paint film. The organic material of the vehicle phase which performs this function may consist essentially of an admixture of precursor ingredients (whether soluble or dispersible in the volatile liquid of the vehicle phase) which interreact to form a resultant matrix film. It may be present as dispersed particles (of size well below 3 microns) coalesceable upon or after evaporation of volatiles to form the film. It may be present as dissolved solids which upon evaporation of volatiles provides the film. It may be such that formation of the film occurs under normal room-temperature conditions or is accomplished by homogeneous fusion or densification (without necessarily obliterating all micropores) of a mixture under elevated temperature conditions insufficient to destroy the essentially discrete elastomeric particulate.

Together with any pigments or other non-volatile ingredients of the vehicle phase, the film-forming organic material of the vehicle phase forms the composite binder matrix phase of an applied paint film of the invention. It is in this binder matrix phase (which may optionally be microporous) that the elastomeric particles are bonded in the finished paint film.

Non-coalescing elastomeric particles (whether solid or hollow or pore-containing) may vary from about 3 microns in size up to about 150 microns (minus 100 mesh U.S. Standard). Particles of varied size are ordinarily employed. In most cases, at least about 20% or 30% of the weight of the particles is accounted for by particles no greater than about 90 microns. Particles above about 150 microns are unsuitable for use in forming paint-type compositions. A negligible quantity (e.g., 5% by weight) of particles larger than 150 microns may be present in some compositions without untoward results. Generally, particles in excess of 150 microns are undesirable because they render paint application difficult. They also cause a problem in hiding underlying surfaces. Except in cases where spray paint application is contemplated, it is preferable from the paintability standpoint (e.g., brush and roll application) to employ a mass of particles not exceeding about 90 microns in size. Usually they should not exceed about 75 microns in size with a major portion no larger than 40 microns in size.

Particles smaller than about 3 microns approach too closely the size of conventional pigment. When present at all, they properly are considered part of the vehicle phase of the compositions. They do not contribute to the velvet-type flatness for these paint films (which flatness is distinct from mere dulling caused by overloading with finely divided conventional pigment).

Most ideal results—in terms of velvety flatness with freedom from glare and an essentially non-textured surface appearance, together with toughness and high mark-resistance, as well as paintability with roll or brush application—are gained by the use of elastomeric particles (particularly spheroidal elastomeric particles) between about 3 (or 5) and 40 (or 50) microns in size. Very good results are gained when the particles are between about 3 and 90 microns in size, with at least about 85% of the total particle weight accounted for by particles no larger than about 75 microns and at least about 50% of the total particle weight accounted for by particles no larger than about 40 microns. Spheroidal particles (particularly those below 90 microns with most smaller than 75 or even 40 microns) are preferred over ground irregular particles. They form flat mark-resistant films which appear essentially non-textured and velvety.

As a generalization, particles below about 90 microns in size contribute to the formation of velvety flat films of essentially non-textured appearance when viewed with the naked eye. If several particles near 90 microns in size are present, the paint film does exhibit a textured appearance when viewed through a microscope; but the texture is not pronouncedly apparent under naked eye viewing. For textured appearance on naked eye viewing, elastomeric particles in excess of 90 microns up to about 150 microns are employed, preferably irregularly-shaped ground particles instead of spheroidal particles. And from the standpoint of gaining coverage with good hiding characteristics, at least about 20% of the weight of the particles should be below 90 microns in size (even below 75 or 40 microns in size). Irregularly-shaped ground particles exhibit less tendency to roll about each other than spheroidal particles; thus, irregularly-shaped particles sometimes cause distinctive texturing which may be accounted for by the formation of some loose agglomerates of the particles (as present in the finished paint film), with elastomeric binder extending as a matrix between the particles in the agglomerates.

Where elastomeric particles of different colors are to be blended to gain a resulting color appearing essentially uniform to the naked eye, the size of the admixed particles should be limited to no more than about 50 or possibly 60 microns. Mixtures of different colored particles below about 25 microns give most ideal results. Admixed different colored elastomeric particles, with at least about 0.1% by weight of particles of one color (present in less amount than other colors) exceeding about 70 or 80 microns in size, gives a resulting attractive speckled appearance useful in some decorative applications.

The relationship between the total volume occupied by dispersed non-coalescing elastomeric particles and the total volume of non-volatile or solids material (both dispersed elastomeric particles and all of the non-volatile material of the vehicle phase) in these compositions is critical. Particle Volume Concentration (PVC) is a useful designation to express this relationship. It is a liquid displacement concept. A Particle Volume Concentration of at least 20% (i.e., at least 20% of the total non-volatile material in the composition being elastomeric particles) is necessary in order to have a sufficient concentration of elastomeric particles to cause a multitude of small or minute "projections" on the exposed surface of the finished film. Such causes visually-flat characteristics to be imparted to the dried finished film of the composition. A Particle Volume Concentration in excess of about 75% causes the composition to be exceedingly difficult to handle as a paintable material to gain films which have their elastomeric particles firmly bonded. Generally, where the PVC is to be maintained below about 40%, it is preferred to employ elastomeric particles extending significantly into the larger sizes permitted (e.g., at least about 40% or even 75% by weight above 90 microns in size). Use of larger particles where low concentrations are employed insures the formation of small surface projections to at least some extent so that resulting flatness appearance from a light diffusing standpoint is gained for the finished film. In the case of smaller particles (e.g., 90 microns or less), the PVC is most desirably maintained at 40% or 50% or more in order to gain the most significant benefits of resulting flat paint film formation. At such higher PVC's, particles in the finished film tend to be piled up on one another, to an extent, through the matrix of even the thinnest films; and they cause slight projections on the surface of the finished films.

It is generally true that the viscosity of mobile compositions for paint application should not exceed about 80,000 or 85,000 centipoises, but even higher viscosities may be employed under special industrial conditions. (Viscosity is taken immediately after vigorous mixing so that the influence of interreaction of components and thixotropy is minimized.) Viscosities as low as 5 or 10 centipoises are satisfactory, though not preferred, in painting operations. At least 5% of the weight of the total vehicle phase of the compositions must be accounted for by non-volatile material. Further, regardless of the presence or absence of pigment and other non-film-formers in the vehicle phase, at least 5% of the weight of that phase must be accounted for by non-volatile elastomer-film-forming organic material. If desired, the vehicle phase may be made up entirely of non-volatile monomeric or related ingredients reactable to form the elastomeric film of the binder matrix. In some cases, however, a quantity of non-volatile ingredients in the vehicle in excess of 80 or 90% of the weight of that phase may cause high viscosities (e.g., in excess of 80,000–85,000 centipoises) not usually preferred for painting operations. Such high viscosity compositions, when marketed, may be reduced in viscosity at the time of use by adding volatile diluents. Preferred paint compositions giving the described performance characteristics will usually contain volatiles in an amount accounting for at least about 20 or 30 weight percent of their vehicle phase. But the main essence of the invention is not per se dependent upon the presence or absence of volatiles in the vehicle phase of the paint.

Coloring matter (chromatic or achromatic—white, greys, and black as well as chromatic colors) may be omitted, but is preferably present in the composition either in the elastomeric particles or in the vehicle phase, or in both places. Without coloring pigment, the composition exhibits a transparent or translucent character which is somewhat frosty in appearance, particularly when viewed at high incident angles. Pigment in the elastomeric particles contributes greatly to the total hiding power of the composition, and causes improved color appearance for painted films at a wide range of incident viewing angles. Thus, pigment in the particles is preferred. In a finished film, the light reflected from projecting particles is largely uniform in intensity at a wider range of viewing angles than is possible with respect to conventional flat pigmented films.

Any of a variety of known pigments may be employed. The quantity of pigment in elastomeric particles or in the vehicle phase must not upset the required parameters for the composition of these parts. In other respects, the quantity may be varied to suit one's desires. The quantity of pigment, whether organic or inorganic (such pigment generally being well below about 2 microns in size), in the elastomeric particles may vary from a fraction of a percent, or 0.1%, when used at all, up to about 40% of their weight. In the non-volatile material portion of the vehicle phase, pigment may be omitted, or be present from a fraction of a percent, or 0.1%, up to about 40% of the weight of that non-volatile material portion.

Other additives such as thickeners and plasticizers may be incorporated in the solids material portion of the vehicle phase, or even in the elastomeric particles, provided elastomeric properties are maintained. If desired, small quantities of particles of rigid nature above about 3 microns in size may also be added; but this is generally not preferred. Any additions must not upset the performance noted herein for the total composition. Glass or metal beads above 3 microns are illustrative rigid particles. When added, they are usually added in sizes varying from about 15 to 100 microns in diameter or even 150 microns in diameter. Preferably at least 50% or so of the weight of the addition of rigid particles is accounted for by rigid particles which are at least as large, or larger, than 80 or 90% of the weight of elastomeric particles in a composition. In such cases, the added beads serve as islands distributed randomly in the finished paint film to bear the brunt of pressures applied over the film. This is particularly advantageous where it is desired to emboss or bend a sheet article comprising the finished film on a substrate sheet material. However, the volume of beads added should preferably not exceed about 25% of the volume of elastomeric particles in a composition. Further, the total volume of all particles above 3 microns in size in the composition, plus any dispersed pigment in the vehicle phase, should account for no more than about 85% of the total volume of non-volatile material in the composition (e.g., at least 15% of the total volume of non-volatiles in the entire composition is organic elastomer-film-forming binder).

Elastomeric particles tend to remain suspended in the compositions for longer periods than ordinary pigment particles. The density or specific gravity of the elastomeric particles is relatively less than that for normal inorganic pigment. It is therefore relatively closer to that for the vehicle phase. Specific gravity for elastomeric particles (even those containing pigment) is in general about 1.2 to 1.4 or 1.7. It is less than the specific gravity for most conventional inorganic pigments. Also, the specific gravity for the vehicle phase normally lies in the range of about 1.0 to 1.2 or even 1.4 or 1.7. It tends to the higher figures when no volatile liquid or only a small amount of volatile liquid is present and a fairly high pigment loading is used.

Several illustrative and non-limitative examples follow:

EXAMPLE I

This composition is designed for paint-like application (e.g., brushing, rolling, and spraying) upon a substrate after mixing together Part A and Part B of the composition.

| Ingredients | Parts by weight in pounds, kilograms | Solids bulking volume gallons per pound, liters per kilogram | Solids gallon (liter) equivalent of solids weight |
|---|---|---|---|
| Part A: | | | |
| Elastomeric particles | 88.0 (39.8) | .093 (.159) | 8.18 (6.34) |
| Xylol (volatile liquid) | 40.0 (18.1) | | |
| Cellosolve acetate (volatile liquid) | 90.0 (40.8) | | |
| Elastomeric binder precursor A (non-volatile reactant) | 100.0 (45.3) | .100 (.171) | 10.00 (7.77) |
| Part B: | | | |
| Elastomeric binder precursor B (non-volatile reactant) | 6.7 (3.03) | .118 (.201) | .79 (.61) |

Weight in pounds (kilograms) times the solids bulking volume in gallons (liters) per pound (kilogram) gives the solids gallons (liters) equivalent of the weight of the non-volatile ingredients. The total solids gallons (liters) divided into the solids gallons (liters) for the elastomeric particles, times 100, gives the percent Particle Volume Concentration for the composition.

The PVC for this composition is 43.2%. Approximately 45.2% of the weight of the vehicle phase is accounted for by non-volatile film-forming elastomeric binder precursor ingredients.

Elastomeric particles for the composition may be either spheroidal or irregular (or angular) as obtained by grinding. Elastomeric particle preparation as such forms no part of the invention of this particular application. Suitable ground particles may be prepared by any known technique, as by grinding frozen elastomeric masses. Bead or dispersion polymerization techniques may be employed to produce spheroidal elastomeric paricles (preferred for brush and roll paint application).

Spheroidal particle preparation

Illustrative spheroidal polyurethane elastomeric particles for this composition may be formed by melting 766.6 parts by weight of a waxy-solid isocyanate-terminated polyester prepolymer ("Multrathane F66" defined below) at about 140° F. (60° C.). To the melt is admixed 24.8 parts by weight of chrome oxide pigment and 33 parts by weight of phthalocyanine green pigment. The mixture is milled on a paint mill having rolls maintained at 200° F. (93° C.). Milling is continued to an intimate blend (i.e., a dispersion of 7+ Hegman reading on a fineness of grind gauge is preferred). The resulting mill base is maintained at approximately 160° F. (71° C.) for extrusion. At that temperature its viscosity is about 1200 centiposes. It is slowly extruded through a 1/16 square inch (40 square millimeters) orifice at a pressure of 30–35 p.s.i. into an aqueous media maintained at about 195° F. (90.5° C.). About 300 parts by weight magnesium carbonate, suspended in about 5,676 parts by weight water, serves as the anti-coagulant. Into this aqueous media is extruded approximately 680 parts by weight of the mill base (remaining mill base was lost).

Immediately as the mill base exits from the extrusion orifice directly into the water, it is dispersed into a multitude of droplets or particles between about 5 and 60 microns in size by a high-speed high-shear mixer located for effective shear action well within one inch of the extrusion orifice. (A suitable high-speed high-shear mixing action is gained by use of a Barrington convertible jet mixer Model BJ–5B operating at approximately 6000 r.p.m.) Extrusion requires approximately 20 minutes. After extrusion is completed, the mixer speed suitably is allowed to drop to about one-third of the original speed; and temperature is allowed to drop to room temperature over a period of two hours. Further lowering of the speed of the mixer may be accomplished, but mixing is maintained for approximately 16 hours (i.e., during the entire time of curing). Then hydrochloric acid in the amount of about 10% in excess of the stoichiometric quantity for reaction with the magnesium carbonate (to convert it to soluble magnesium chloride) is added to the water; and the polymerized polyurethane spheres are separated from the liquid media by filtration, washed with water and dried at about 140° F. (60° C.).

Contrary to suggestions in the prior art to the effect that water in contact with isocyanate causes foaming with curing to give a porous structure, the spherules formed according to this illustration are water-cured and essentially free of pores. They are dense. Essentially all of the spherules formed as illustrated are within the size range of 5 to 75 microns, with at least 50% of the weight thereof below 40 microns, and the entire mass is useful. (A wider distribution of particle sizes, if desired, may be obtained by less vigorous high-speed high-shear mixing action upon extrusion.)

Remaining ingredients of formula

The volatile liquids in the formula are solvents for the elastomeric binder precursor materials. The elastomeric particles are insoluble in those liquids (but the elastomeric particles may optionally swell as a result of some liquid pick-up).

Elastomeric binder precursor A ("Multrathane F66") is a waxy-solid isocyanate terminated polyester prepolymer formed by reacting 4-4′diphenyl methane diisocyanate with a polyester (i.e., the ester reaction between a glycol and dicarboxylic acid). It has an equivalent weight of 627–667 (i.e., its gram molecular weight per isocyanate group is 627–667). Approximately 6.3 to 6.7% of its weight is accounted for by isocyanate (NCO) groups.

Elastomeric binder precursor B is 1–4 butanediol. When this ingredient is blended with precursor A, a slow curing reaction between the materials takes place (e.g., approximately 48 hours at room temperature) to produce a polyurethane elastomer.

When the vehicle phase ingredients of the formula are blended together and the viscosity promptly taken (using a Brookfield viscometer, 75° F. (24° C.)., 60 r.p.m., No. 1 spindle), a reading of about 60 centiposes is obtained. The viscosity gradually increases because of the reactability of the ingredients A and B. This formula illustrates that variable viscosities are possible for the vehicle phase. Also, it is evident from the formula that reactable monomeric type constituents may be employed, with essentially no volatile solvent content, for the vehicle phase.

Where the formula is to be painted reasonably promptly (within about 4 hours) upon a substrate, all ingredients (both part A and part B ingredients) are mixed together with agitation for about 15 minutes. Also, where the mixture is to be stored or shipped under refrigerated conditions (e.g., between 35° F. (2° C.) or 40° F. (5° C.)) for only a week or so before use, it is suitable to mix all ingredients together prior to placing them in a sealed container for refrigerated storage and shipment. Usually, part A is prepared separately, with violent agitation, to gain a uniform but random distribution of the elastomeric particles throughout the other ingredients (i.e., the vehicle phase) of part A. Then part A and part B are placed in separate sealed containers for shipment. Shortly before paint application of the composition, the part B ingredient is added and intimately blended with part A as by stirring. Viscosity promptly after admixture is found to be about 475 centipoises (Brookfield, 75° F. (24° C.), 60 r.p.m., No. 2 spindle).

Upon application of this composition as a paint film upon a substrate, the volatile liquids escape and gradual interreaction between the precursor ingredients takes place. The composition cures (by reaction between the precursor ingredients) to provide a tough protective attractive forest green colored film which is visually-flat and highly resistant to marking. The finished film is velvety and appears uniformly flat to the naked eye. It is deformable, and recoverable from deformation. But since it is a mere paint film, its deformability and recoverability from deformation are not readily observable characteristics. Rubbing one's fingernail or a steel pointer over it does not leave a mark on it. Based upon several tests, it appears that the deformability and recoverability or restitution of the film largely account for its non-abrading characteristics and its high resistance to marking. This is particularly true as compared to the marking characteristics of flat paint film formed by using compositions containing large quantities or large particles of inorganic pigment material or even organic non-elastomeric particles (such as polypropylene flatting particles).

EXAMPLE II

This formula is the same as Example I, except that the spheroidal elastomeric particles are replaced by ground elastomeric particles formed from a polyurethane elastomer mass. The polyurethane elastomer mass was formed by reacting the mill base of Example I, while at about 150° F. (65.5° C.), with about 51 grams of admixed 1-4 butanediol (a curing reactant for the prepolymer of the mill base). The mill base of Example I is described under "Spheroidal Particle Preparation." About 16 hours at 130° F. (54.5° C.) causes the mixture to be substantially cured. It is then frozen using solid carbon dioxide and abraded using a belt sander of grit 80. Few, if any, particles below 3 microns in size are formed by this technique. Some particles may have web connections to others. Abraded particles are classified and those passed through a 100 mesh screen (150 microns) are used in the composition (although material passing 200 mesh (75 microns) is preferred). At least 80% of the weight of the mass passing 100 mesh is below 125 microns in size. About 15 or 20 weight percent of the particles of the mass is below 90 microns.

The composition of this example gives a resulting paint film (preferably formed by spraying) which is flat and mark-resistant and which appears attractively textured to the naked eye.

The viscosity of the composition of this example (with the elastomeric particles present), as taken immediately after admixture of part A and part B ingredients, was lower than that for Example I under identical conditions. Specifically, the viscosity of this composition was 430 centipoises as compared to 475 centipoises for Example I.

weight methyl methacrylate and 40% ethyl acrylate. A suitable copolymer dispersion ("Rhoplex AC–33") contains about 46% by weight thermoplastic organic solids stably dispersed as minute droplets less than about 0.2 micron in size. This material satisfies the properties for the elastomeric binder.

To make the composition, first wet the elastomeric particles with the 51 parts of water and the wetting agent. The resulting slurry is mixed with a pre-blended mixture of the remaining ingredients of the formula using a high-speed high-shear mixer to gain blending. The final mixed composition exhibits a viscosity of and 1600 centipoises (Brookfield, 75° F. (24° C.), 60 r.p.m., No. 4 spindle). The vehicle phase of this composition exhibits a viscosity of about 350 centipoises (Brookfield, 75° F. (24° C.), 60 r.p.m., No. 2 spindle).

On painting (preferably by spraying) and drying, this composition provides a black, tough, elastomeric, mark-resistant, visually-flat but textured surface film. Drying takes place by evaporation of the water. It is followed by gradual coalescence of the dispersed droplets of acrylic copolymer solids at room temperature into a finished unified continuous elastomeric matrix film.

EXAMPLE IV

The formula of this example is preferably supplied in two containers, the contents of which are mixed prior to use, as in Example I.

| Ingredients | Parts by weight in pounds, kilograms | Solids bulking volume gallons per pound, liters per kilogram | Solids gallon (liter) equivalent of solids weight |
|---|---|---|---|
| Part A: | | | |
| Elastomeric particles (20–40 microns size) | 30 (13.6) | .0935 (.16) | 2.805 (2.174) |
| Xylol (volatile liquid) | 27.5 (12.4) | | |
| Ethylene glycol monoethyl ether acetate (volatile liquid) | 22.5 (10.2) | | |
| Elastomeric binder precursor A solids ("Multron R18") | 16 (7.25) | .101 (.173) | 1.616 (1.256) |
| Elastomeric binder precursor B solids ("Multron R12") | 4 (1.8) | .106 (.181) | .424 (.326) |
| Part B: | | | |
| Elastomeric binder precursor C (75% solids dissolved in ethyl acetate) | 13.0 (5.9) | .0904 (.154) | .881 (.681) |

EXAMPLE III

The formula of this example illustrates a black paintable composition which may be marketed in a single container. The user may paint the composition directly from the container without need for pre-mixing separate parts.

The PVC is 48.9%. Non-volatiles account for about 35.8% by weight of the vehicle. Elastomeric particles are similar to those of Example I, except that about 70 parts rutile titanium dioxide pigment and about 4.4 parts phthalocyanine green replace the pigmentation of the particles of Example I.

| Ingredients | Parts by weight in pounds, kilograms | Solids bulking volume gallons per pound, liters per kilogram | Solids gallon liter-equivalent of solids weight |
|---|---|---|---|
| Elastomeric particles (5 to 90 microns) | 95.0 (43.0) | 0.096 (.164) | 9.12 (7.05) |
| Wetting agent (sodium lauryl sulfate) | 0.01 (.0045) | | |
| Water | 51.0 (23.1) | | |
| Water dispersion of elastomeric binder (46% solids by weight) | 87.7 (39.6) | 0.1044 (.1785) | 4.22 (3.26) |
| Water solution of thickener (5% by weight hydroxy-propylmethyl cellulose) | 8.8 (3.98) | 0.120 (.205) | 0.53 (0.04) |
| Water dispersion of pigment (25% by weight carbon black pigment less than a micron in size) | 3.5 (1.58) | 0.067 (.114) | 0.058 (0.045) |

The PVC is 67.8%. Elastomeric particles plus pigment of the vehicle phase account for about 68.2% of the total volume of non-volatiles. Organic film-forming binder material accounts for 26.7% by weight of the vehicle. The total nonvolatile vehicle accounts for 27.6% of that phase.

Elastomeric particles for this composition may be formed as described in Example II. Illustrative particles for this black composition may contain about 50 parts by weight of carbon black instead of the chrome oxide and phthalocyanine green pigmentation employed for the particles of Example II.

An illustrative water dispersion of binder is an aqueous dispersion of an acrylic copolymer of methyl methacrylate and ethyl acrylate. The copolymer contains about 60% by For the elastomeric binder precursor solids, a mixture of two polyesters is used. Precursor A ("Multron R18") is a slightly branched hydroxyl-terminated polyadipate polyester having a hydroxyl number of 57–63 and an acid number no greater than 1.5. Percursor B ("Multron R12") is a moderately branched polyester of the same type as precursor A, but having a hydroxyl number of 158–175 and an acid number no greater than 4.0.

The elastomeric binder precursor C ("Mondur CB75") is a polyisocyanate prepolymer having a ratio of NCO:OH of 2:1, formed by reacting toluene di-isocyanate and a tri-functional polyol such as trimethylol-propane. It has an isocyanate content of about 13% by weight, an isocyanate equivalent of about 323.

Because this composition has a reasonably long pot life after mixing, it is more conveniently handled in painting operations than the composition of Example I. Usually, the ingredients of part A are first mixed together (e.g., using vigorous agitation such as gained in a high-speed mixer in order to gain maximum dispersion of the elastomeric particles and solution of the elastomeric binder precursor solids in the volatile liquid). Then the part B ingredient is added with additional mixing at the time of use. Promptly on admixing, the viscosity exhibited by this composition is 115 centipoises (Brookfield, 75° F. (24° C.), 60 r.p.m., No. 2 spindle); whereas the vehicle phase (without elastomer) exhibits a lower viscosity of about 16 centipoises (Brookfield, 75° F. (24° C.), 60 r.p.m., No. 1 spindle).

Applied as a film upon a substrate by ordinary paint methods, this composition dries essentially free of volatile liquid and cures by interreaction between precursor ingredients within about 72 hours at room temperature to provide a tough, mark-resistant, uniformly-visually-flat, velvety-appearing, finished film having a pastel green color.

EXAMPLE V

This example illustrates an extremely complex formulation, containing many incidental additions for functions as well understood in the art. The composition is a one-part composition having an indefinitely long life in a sealed can, and capable of being applied by ordinary paint methods, particularly spraying, to provide a visually-flat mark-resistant beige colored surface film.

elastomer is formed by reacting 27.2 parts of the elastomeric binder precursor A ("Multron R18") of Example IV and 6.8 parts of the elastomeric binder precursor B ("Multron R12") of Example IV, with approximately 21.4 parts of elastomeric binder precursor C ("Mondur CB75") of Example IV. Additionally, these elastomeric particles contain approximately 18.68 parts xylol and approximately 20.2 parts Cellusolve acetate as volatile liquid. They are microporous ground particles formed by curing a solvent-dispersed blend of the solids ingredients while retaining the solvent or volatile liquid as a part of the mass (i.e., the mixture is cured in a sealed container at about 130° F. (54.5° C.) for about 72 hours), after which the resulting crumbly mass is ground and milled to divide it into particles having a size range of approximately 3 to 150 microns with at least 80 weight percent of the particles within the range of approximately 10 to 125 microns, and approximately 50 weight percent smaller than 90 microns.

All pigments in the particles and in the liquid phase of the composition are finely-divided pigments of a conventional size; they are below approximately 1 micron.

The composition is prepared by first wetting the solvated (or liquid-containing) elastomeric particles with the other ingredients of the wetting mixture using conventional stirring. Then the binder addition is added with further stirring to gain dispersion of solids ingredients uniformly throughout the volatile liquid phase. While the foregoing is being accomplished, the mill base addition is prepared by milling the ingredients listed for that addition for

| Ingredients | Parts by weight in pounds kilograms | Percent by weight solids of each ingredient | Solids weight in pounds, kilograms | Solids bulking volume gallons per pound, liters per kilogram | Solids gallon (liter) equivalent of solids weight |
|---|---|---|---|---|---|
| Wetting mixture: | | | | | |
| Elastomeric particles containing volatile liquid | 40.7 (18.45) | 55.87 | 22.65 (10.26) | .089 (.152) | 2.2 (1.56) |
| Water | 10.79 (04.89) | | | | |
| Ammonium hydroxide (2890 solution) | .28 (00.127) | | | | |
| Fungicide (di(phenyl mercuric dodecenyl succinate)) | .006 (00.0027) | 20 | .001 (00.0005) | (¹) | (¹) |
| Ethylene glycol (volatile liquid) | 1.7 (00.77) | | | | |
| Nonionic wetting agent ("Triton CF10", an alkyl aryl ether) | .01 (00.0045) | 100 | .01 (00.0045) | .11 (.188) | .001 (0.00085) |
| Anionic dispersant ("Tamal 731", a 25% water solution of a sodium salt of carboxylated polyelectrolyte) | .05 (00.023) | 25 | .012 (00.006) | .11 (.188) | .001 (0.001) |
| Binder addition, Water dispersion of elastomeric binder of Example III | 27.8 (12.6) | 46 | 12.8 (05.8) | .0958 (.164) | 1.225 (0.95) |
| Mill base addition: | | | | | |
| Rutile TiO₂ pigment | 5.4 (02.45) | 100 | 5.4 (02.45) | .0286 (.049) | .154 (0.120) |
| Red iron oxide pigment | .04 (00.018) | 100 | .04 (00.018) | .029 (.049) | .001 (0.0009) |
| Yellow iron oxide pigment | .16 (00.07) | 100 | .16 (00.07) | .0304 (.052) | .005 (0.0038) |
| Black iron oxide pigment | .05 (00.022) | 100 | .05 (00.022) | .0254 (.0435) | .001 (0.001) |
| Water solution of thickener ("Methocel", a 2% solids solution of hydroxypropyl methyl cellulose) | 4.4 (02.0) | 2 | .088 (00.04) | .1 (.171) | .084 (0.068) |
| Nonionic wetting agent ("Triton") | .064 (00.029) | 100 | .064 (00.029) | .11 (.188) | .007 (0.006) |
| Amonic dispersant ("Tamol 731") | .25 (00.11) | 25 | .062 (00.028) | .11 (.188) | .007 (0.005) |
| Water | 4.0 (01.8) | | | | |
| Final thickener addition, Water solution of above thickener ("Methocel") | 4.3 (01.95) | 2 | .086 (00.039) | .1 (.171) | .084 (0.066) |
| Total | 100.000 (45.316) | | 41.433 (18.767) | | 3.59 (2.78) |

¹ Not significant.

The PVC is 56.3%. Non-volatiles account for about 31.6% of the weight of the vehicle phase (which phase excludes volatiles within the elastomeric particles). Solids elastomeric binder in the vehicle phase accounts for approximately 21.6% by weight of that phase. Pigment in the vehicle phase plus elastomeric particles (non-volatile content thereof) of the composition account for about 60.8% of the total volume of the non-volatile ingredients. The total non-volatile content of the mixture is 41.4% by weight.

The elastomeric particles of this composition contain approximately 5.5 parts by weight rutile $TiO_2$ pigment, .17 part molybdate orange pigment, .01 quinacridone violet pigment, .10 part light chrome yellow pigment, .01 part carbon black pigment, and .03 part of an alkyl ammonium magnesium montmorillonite thixotropic agent ("Bentone 38"). These pigments and fillers are all dispersed in the elastomer of the elastomeric particles. The about 16 to 24 hours on a pebble mill. Then the mill base is added to the other ingredients, followed by the addition of the final quantity of thickener. The entire batch is mixed together and run through a high speed stone mill to disperse the elastomeric particles and further divide or tear agglomerates of the same apart such that the final composition contains elastomeric particles of a size range between approximately 3 to about 125 microns, with at least 70% by weight of the same below about 90 microns. The viscosity of this composition is 2500 centipoises (Brookfield, 75° F. (24° C.), 60 r.p.m., No. 4 spindle), and the viscosity of the vehicle phase of this composition is 205 centipoises (Brookfield, 75° F. (24° C.), 60 r.p.m., No. 2 spindle).

When this composition is painted as a film and allowed to dry free of volatiles (which occurs in about 4 hours), the dispersed binder solids of this composition coalesce into a homogeneous elastomeric matrix binder. The resulting dried finished film is tough, optically flat, textured and mark-resistant.

| Ingredients | Parts by weight in pounds, kilograms | Solids bulking volume gallon per pound, liters per kilogram | Solids gallon (liter) equivalent of solids weight |
|---|---|---|---|
| Elastomeric spheroids from Example I | 45 (20.4) | .093 (.159) | 4.19 (3.25) |
| Cyclohexanone (volatile liquid) | 270 (122.2) | | |
| Elastomeric polyurethane | 30 (13.6) | .0996 (.17) | 2.985 (2.317) |

EXAMPLE VI

An interesting plasticizer modified material which possesses the properties necessary for the elastomeric binder of the compositions hereof is plasticizer-modified polyvinyl chloride. An illustration of a composition of this type is:

| Ingredients | Parts by weight in pounds, kilograms | Solids bulking volume gallons per pound, liters per kilogram | Solids gallon (liter) equivalent of solids weight |
|---|---|---|---|
| Spheroid elastomeric particles from Example I | 150 (68) | .093 (.159) | 13.95 (10.81) |
| VM&P naphtha (volatile liquid) | 12 (8.6) | | |
| Dioctyl phthalate plasticizer | 40 (18.5) | .122 (.208) | 4.88 (3.86) |
| Polyvinyl chloride ("Geon 121") | 66 (29.9) | .086 (.147) | 5.67 (4.39) |

The PVC for this composition is 56.9%. It has a total solids content of 93.1%, and a non-volatile solids content accounting for 85% of the vehicle phase.

In formulating the composition of this example, the polyvinyl chloride in finely-divided particle form (less than 2 microns particle size) is dispersed in the dioctyl phthalate plasticizer therefor by stirring. This forms a plastisol. Then the naphtha is added for dilution purposes. Finally, the elastomeric spheroids are mixed in by stirring (e.g., using a Waring Blendor).

The viscosity of this composition on formation is approximately 60,000 centipoises (Brookfield, 75° F. (24° C.), 60 r.p.m., No. 4 spindle). Its vehicle phase alone exhibits a viscosity of about 85 centipoises (Brookfield, 75° F. (24° C.), 60 r.p.m., No. 2 spindle).

When coated as a paint film, the composition of this example may not appear to provide an elastomeric finished film even after an extended time at room temperature. Nevertheless, the solids binder material of its vehicle phase possesses the necessary elastomeric requirements after the coated film is subjected to about 350° F. (188° C.) for 15 minutes to cause homogeneous densification (e.g., fusion) of it. The heating causes the vehicle-phase mixture of organic film-forming ingredients to be converted to the finished film state possessing elastomeric properties. For compositions requiring heat to provide a finished film, it is practical to employ essentially fully-cured elastomeric particles (or at least elastomeric particles which do not melt or fuse under the heat treatment).

Excellent visually-flat and mark-resistant films of this composition may be formed on sheet stock capable of withstanding temperatures required for fusion or densification of the coating. Preferably, the composition is applied after a further reduction of viscosity by the addition of a few percent by weight of volatile ingredients. Metal sheet stock, when coated, is desirably pre-treated or primed with a priming film, as well known in the art. Factory controlled operation is possible. It is possible even knife coating may be used.

EXAMPLE VII

The following illustrates a formula having a long pot life and one which is non-curing in the film state. It contains an elastomeric-film-forming matrix ingredient dissolved in a volatile liquid. The elastomeric-film-forming matrix component is in "elastomeric" condition while dissolved in the volatile liquid of the vehicle phase.

The PVC of this composition is 58.5%. Its total solids content is 21.75% by weight. The elastomeric polyurethane accounts for approximately 10% by weight of the vehicle.

Suitable elastomeric polyurethanes may be prepared according to the teaching of Schollenberger U.S. Pat. No. 2,871,218, granted Jan. 27, 1959, here incorporated by reference. Products of such type are available commercially; and a trademarked product called "Estane 5740X1" is considered especially desirable for use in compositions of the type illustrated by this example. Illustrative elastomeric polyurethanes useful according to this example are substantially free of cross-links, and are essentially linear in character. They exhibit thermoplastic properties in addition to their other properties. They may be prepared as reaction products by heat reacting a mixture of (A) one mol of an essentially linear hydroxyl terminated polyester of a (1) saturated, aliphatic glycol having from 4 to 10 carbon atoms and having hydroxyl groups on its terminal carbon atoms and a (2) material selected from the group consisting of a dicarboxylic acid of the formula HOOC—R—COOH, where R is an alkylene radical containing from 2 to 8 carbon atoms and its anhydride, said polyester having an average molecular weight between 600 and 1200 and having an acid number less than 10, and (B) from about 1.1 to 3.1 mols of a diphenyl diisocyanate having an isocyanate group on each phenyl nucleus in the presence of (C) from about 0.1 to 2.1 mols of a saturated, aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate, whereby there are essentially no unreacted groups of the class consisting of isocyanate and hydroxyl groups in said reaction product.

The composition of this example may be applied by brush, roll or spray coating methods to give a forest green mark-resistant visually-flat velvety-appearing paint film. Drying in the nature of homogeneous densification takes place by evaporation of the cyclohexanone, which normally is relatively slow to evaporate from an applied paint film (e.g., several hours up to about 12 hours). If desired in industrial applications, heating of the applied film may be employed to drive out the solvent faster.

The total formula for this example exhibits a viscosity of about 900 centipoises (Brookfield, 75° F. (24° C.), 30 r.p.m., No. 2 spindle); whereas the vehicle phase of this composition exhibits a viscosity of 205 centipoises (Brookfield, 75° F. (24° C.), 60 r.p.m., No. 2 spindle).

In Table I, several properties for the elastomeric phases of the paint films formed using the formulations of the examples are set forth.

TABLE I

| Example: | | Abrasion, Taber | Hardness, Shore A-2 | Elongation at break, percent | Tensile set at 45% elongation | Coefficient of restitution |
|---|---|---|---|---|---|---|
| I | E.P. | .1 | 75 | 360 | Less than 5% | 25 |
|   | V.S. | .1 | 80 | 500 | do | 35 |
|   | V.B.S. | .1 | 80 | 500 | do | 35 |
| II | E.P. | .1 | 80 | 500 | do | 30 |
|   | V.S. | .1 | 80 | 500 | do | 35 |
|   | V.B.S. | .1 | 80 | 500 | do | 35 |
| III | E.P. | .1 | 80 | 450 | do | 25 |
|   | V.S. | .6 | 90 | 500 | do | 20 |
|   | V.B.S. | .4 | 90 | 450 | do | 15 |
| IV | E.P. | .1 | 75 | 360 | do | 25 |
|   | V.S. | .3 | 70 | 85 | do | 15 |
|   | V.B.S. | .3 | 70 | 85 | do | 15 |
| V | E.P. | .4 | 60 | 140 | do | 30 |
|   | V.S. | .7 | 90 | 500 | Less than 10% | 20 |
|   | V.B.S. | .4 | 90 | 450 | Less than 5% | 15 |
| VI | E.P. | .1 | 75 | 360 | do | 25 |
|   | V.S. | .4 | 80 | 280 | do | 10 |
|   | V.B.S. | .4 | 80 | 280 | do | 10 |
| VII | E.P. | .1 | 75 | 360 | do | 25 |
|   | V.S. | .1 | 85 | 640 | do | 25 |
|   | V.B.S. | .1 | 85 | 640 | do | 25 |

NOTE:
E.P. refers to the elastomeric particles (i.e., their composition) as they exist in a finished paint film.
V.S. refers to the composition of vehicle phase solids as that composition exists in a finished paint film.
V.B.S. refers to the vehicle-binder-solids composition, that is, the composition of the film-forming organic material (no pigment) of the vehicle phase, as that composition exists in a finished paint film.

The term "finished," as applied to paint films of the invention, refers to films essentially free of volatile liquid constituents and essentially free of bubbles, and which have undergone (1) curing of the film-forming organic matrix binder in the case of chemically-reactable vehicle mixtures, or (2) coalescence of dispersed coalesceable particles of film-forming matrix binder in the case of dispersed film-formers, or (3) homogeneous densification of dissolved (or dispersed) film-forming solids matrix binder (particularly in the case of nonreactable components), or (4) any combination of the foregoing. Finished films is "essentially free of bubbles" may contain a small amount of micropores (e.g., the elastomeric particles of Example V do contain such micropores in a partially "collapsed" state in the finished film. Or they do not contain void spaces of microscopic character. But they do not contain larger voids of macroscopic character (i.e., visible with the naked eye when viewing cross sections through the film).

All test values in the table are obtained using thicker samples of the composition of the phases of the finished paint films than conventionally present in finished paint films. The samples must be prepared so that they are essentially free of bubbles (macroscopic bubbles upset the reliability of test results). An excellent way of doing this so that the solvent of the composition does not cause macroscopic bubble formation is to allow a relatively long time (e.g., even a week in the case of thicker sections) to pass for solvent evaporation (and solvent evaporation may be aided by placing the sample in a chamber of reduced pressure). For solvent evaporation, the sample is preferably at room temperature or a temperature only slightly above (e.g., up to about 130° F. (55° C.)). Further, when preparing samples, it is preferable to employ as little beginning solvent or volatile material in the composition as possible, while retaining good handling characteristics and blending of components. In finished paint films, bubble entrapment is not a significant problem since the films are so thin (e.g., a few microns up to 75 or 100 or 150 microns). In the case of micropore-containing elastomeric phases (e.g., the particles of Example V), it is suitable to prepare thick samples for test purposes by being very meticulous about slow solvent evaporation (even if curing is accomplished before solvent evaporation) so as to avoid macroscopic bubble formation.

The relationship between properties in the table and the performance of finished paint films is believed to be as follows: Abrasion resistance and elongation at break are indicators of toughness and resistance of a finished film to tearing and scuffing. Tensile set and the coefficient of restitution are indicators of deformability with sufficient recoverability after deformation to leave a finished film essentially unmarked by deformation. Hardness is an indicator of nonabrasive action by the major film phases themselves.

Abrasion (Taber) values were obtained using the rotary platform, double headed apparatus and method as described in ASTM-D-1175. Specifically the apparatus used was Taber abraser Model 174 of Taber Instrument Company, North Tonawanda, N.Y., with H-18 abrading wheels and a 1000 gram load. The abrasion values listed are in grams of weight loss suffered by a specimen (⅛ inch (3.17 mm.) thick and 4 inches (10.2 cm.) in diameter) per 1000 cycles of planetary specimen rotation (70 revolutions per minute) in the Taber abraser. Elastomeric compositions for the invention exhibit less than 4 grams weight loss in this test, preferably less than 2 grams weight loss.

Hardness (Shore Durometer Hardness Type A-2) values are obtained according to ASTMD 1706-61. A type A-2 Shore indentor point is used. The values are maximum durometer values. Generally, elastomeric materials of the invention are not harder than a Shore Durometer of about 95. They have a hardness of at least 20 (otherwise the material is too soft to resist marks of indention and smearing). Preferably durometer readings are above 45. Values are set forth in the table in multiples of 5.

Elongation at break is obtained according to ASTMD-412-61T. The test procedure is conventional for determining the elongation at break of elastomer materials. Values are expressed in the percent that the specimen at rupture exceeds the original length of the specimen. Elastomeric materials for the invention have an elongation of at least 50%, preferably at least about 75%.

Tensile set at 45% elongation is determined as follows: A specimen (about ⅛ inch (0.317 cm.) square in cross section, with enlarged ends for gripping) is stretched to 145% of its original length and immediately released. After 10 minutes, the length of the specimen (not its enlarged ends) is measured. The excess of the second measurement of length over the original length, divided by the original length and multiplied by 100, gives the set in percent. For elastomeric materials of the invention, the set at 45% elongation is less than 10%, preferably less than 5%.

Coefficient of restitution values are in percent. They are derived by dividing the maximum height achieved by a rebounding plunger, by the original height of the plunger before dropping, and then multiplying the result by 100. Values were obtained using the resiliometer of the Precision Scientific Company; this device consists essentially of a level specimen-holding platform, a vertically mounted scale, a one ounce (28.35 grams) stainless steel plunger guided for free vertical drop and rebound (to and from a specimen) by a vertical stainless steel rod, and mechanical plunger release means. Specimens about 1 inch (2.54 cm.) in diameter and ½ inch (1.27 cm.) thick are subjected to test. The average of three readings were used for the values listed in Table I; and the result is listed in a whole number multiple of 5. Elastomeric materials of the invention exhibit coefficients of restitution at least above 5%, preferably above 10%.

This invention is not dependent upon any one chemical compound, since the properties of different compounds may be modified by blending ingredients therewith. For example, plasticizers may be added to an otherwise unsuitable chemical compound to convert it into a mass exhibiting the elastomeric properties for the invention. Also, new chemical compounds may be tailored to provide the elastomeric properties discussed.

That which is claimed is:

1. A coating composition for forming attractive nontacky paint-like films that are essentially glare-free as well as mark-resistant, tough, and non-abrading, said composition consisting essentially of (A) a mobile elastomeric-film-forming vehicle phase, of which at least 5 weight-percent comprises non-volatile elastomeric-film-forming organic material, and the total non-volatile material of which comprises between 60 and 100 weight-percent said elastomeric-film-forming material, and between 0 and 40 weight-percent pigment; and (B) discrete non-coalescing elastomeric particles uniformly dispersed in the mobile vehicle phase and adapted to become dispersed and permanently bonded in the elastomeric film formed by the vehicle phase to serve as a flatting agent for the film, said elastomeric particles being (a) insoluble in the vehicle phase, (b) between 3 and 150 microns in diameter, (c) dispersed in the vehicle phase at a particle volume concentration of 20 to 75 percent, and (d) including between 0 and 40 weight-percent pigment; the total volume of any dispersed pigment in the vehicle phase and of all particles in the composition above 3 microns in size comprising no more than 85 volume-percent of the nonvolatile material in the composition; and the elastomeric particles and the elastomeric-film-forming material exhibiting in the tests described an abrasion value of less than 4 grams weight loss, a Shore A–2 hardness of between 20 and 95, an elongation at break of at least 50 percent, a tensile set at 45 percent elongation of less than 10 percent, and a coefficient of restitution of at least 5 percent.

2. The composition of claim 1 in which the elastomeric particles include coloring pigment and the vehicle phase is essentially free of coloring pigment.

3. The composition of claim 1 in which both the elastomeric particles and the vehicle phase are essentially free from coloring agents.

4. The composition of claim 1 in which elastomeric particles of at least two different colors are included.

5. The composition of claim 1 in which the elastomeric particles comprise a crosslinked elastomeric material and the elastomeric-film-forming material comprises ingredients that form a crosslinked elastomeric film.

6. The coating composition of claim 1 in which the elastomeric particles and the elastomeric film-forming material exhibit in the tests described an abrasion value of less than 2 grams weight loss, a Shore A–2 hardness of between 45 and 95, an elongation at break of at least 75 percent, a tensile set at 45 percent elongation of less than 5 percent, and a coefficient of restitution of at least 10 percent.

7. The composition of claim 1 in which the elastomeric-film-forming material in the vehicle phase comprises ingredients that form an elastomeric polyurethane film and the elastomeric particles comprise polyurethane.

8. The composition of claim 1 in which the elastomeric-film-forming material comprises ingredients that form a crosslinked elastomeric polyurethane film, the elastomeric particles comprise a crosslinked elastomeric polyurethane material, a major portion of the particles are less than 75 microns in size, the particles include coloring pigment, and the vehicle phase is essentially free of coloring pigment.

9. The composition of claim 1 in which the nonvolatile elastomer-film-forming organic material comprises a mixture of reactable elastomeric precursor ingredients, said composition being formed into the finished film state by curing of said precursor ingredients.

10. The composition of claim 1 in which the nonvolatile elastomer-film-forming organic material comprises coalesceable droplet particles of organic film-forming binder solids dispersed in a volatile liquid material, the latter accounting for between 40 and 95% of the vehicle phase of the composition; and said composition being formable into the finished film state by coalescence of the dispersed vehicle droplet particles of film-forming solids into an essentially unified elastomeric matrix after evaporation of the volatile liquid material from an applied film.

11. The composition of claim 1 in which the nonvolatile elastomer-film-forming organic binder material comprises a film-forming mixture of non-volatile ingredients dispersed in a volatile liquid material, said composition being formable into the finished film state by homogeneous densification of the mixture of film-forming ingredients at an elevated temperature into an essentially unified elastomeric matrix after evaporation of volatile liquid material from an applied film.

12. The composition of claim 1 in which the nonvolatile elastomer-film-forming organic material is dissolved in a volatile liquid material, the latter accounting for no more than 95% of the vehicle phase of the composition.

13. The composition of claim 1 in which the nonvolatile elastomer-film-forming organic binder material is thermoplastic in the finished film.

14. The composition of claim 1 in which the elastomeric particles are spheroidal in shape.

15. The composition of claim 1 in which the Particle Volume Concentration for the elastomeric particles is between 40 and 75%.

16. The composition of claim 1 having glass beads dispersed therein in a volumetric amount not in excess of one-fourth the volume of elastomeric particles present therein.

17. An article comprising a substrate coated with a dry attractive nontacky paint-like film that is essentially glare-free as well as mark-resistant, tough, and non-abrading, said film consisting essentially of (A) an elastomeric matrix film which comprises between 60 and 100 weight-percent organic elastomeric material, and between 0 and 40 weight percent pigment; and (B) discrete non-coalescing elastomeric particles uniformly dispersed and permanently bonded in the elastomeric matrix film to serve as a flatting agent for the film, said elastomeric particles being (a) insoluble in the matrix film, (b) between 3 and 150 microns in diameter, (c) dispersed in the matrix film at a particle volume concentration of 20 to 75 percent; and (d) including between 0 and 40 weight-percent pigment; the total volume of any dispersed pigment in the matrix film and of all particles in the film above 3 microns in size comprising no more than 85 volume-percent of the film; and the material of the elastomeric particles and the material of the elastomeric matrix film exhibiting in the tests described an abrasion value of less than 4 grams weight loss, a Shore A-2 hardness of between 20 and 95, an elongation at break of at least 50 percent, a tensile set at 45 percent elongation of less than 10 percent, and a coefficient of restitution of at least 5 percent.

18. The article of claim 17, the substrate of which comprises the surface of a sheet material.

References Cited

UNITED STATES PATENTS

| | | | |
|---|---|---|---|
| 2,643,234 | 6/1953 | Backus | 260—5 |
| 3,044,899 | 7/1962 | Canterino. | |
| 3,005,790 | 10/1961 | Wynn et al. | 260—37 |
| 3,283,036 | 11/1966 | Larson | 260—897 |

FOREIGN PATENTS

| | | |
|---|---|---|
| 688,173 | 2/1953 | Great Britain. |

MORRIS LIEBMAN, Primary Examiner

S. L. FOX, Assistant Examiner

U.S. Cl. X.R.

117—161; 260—40, 41.5, 858, 897